(12) United States Patent
Jones et al.

(10) Patent No.: US 6,519,864 B1
(45) Date of Patent: Feb. 18, 2003

(54) ARTICLE HAVING A LOCATED AND CLAMPED CYLINDRICAL OBJECT THEREIN

(75) Inventors: Daniel Edward Jones, Batavia, OH (US); Jacques Juneau, Jr., Amelia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/015,368

(22) Filed: Dec. 13, 2001

(51) Int. Cl.[7] .................................................. G01B 7/00
(52) U.S. Cl. ........................ 33/572; 33/DIG. 5; 33/832; 269/77
(58) Field of Search .............................. 33/572, DIG. 5, 33/265, 712, 783, 784, 832; 269/76, 77, 78

(56) References Cited

U.S. PATENT DOCUMENTS

| | | | |
|---|---|---|---|
| 4,141,150 A | | 2/1979 | Miller |
| 4,543,732 A | | 10/1985 | Maples |
| 4,564,164 A | * | 1/1986 | Allen et al. ................. 269/78 |
| 4,836,522 A | * | 6/1989 | Smith .......................... 269/77 |
| 4,864,733 A | | 9/1989 | Gillberg |
| 4,984,373 A | * | 1/1991 | Forrest ........................ 33/265 |
| 5,123,175 A | | 6/1992 | van der Kuur |
| 5,979,070 A | | 11/1999 | Lau |
| 6,116,845 A | * | 9/2000 | Wright et al. ................ 269/77 |
| 6,154,976 A | * | 12/2000 | Yamashiro et al. ......... 33/832 |
| 6,338,202 B1 | * | 1/2002 | Brunner ..................... 33/832 |

* cited by examiner

*Primary Examiner*—Christopher W. Fulton
(74) *Attorney, Agent, or Firm*—V. G. Ramaswamy; Gregory O. Garmong

(57) ABSTRACT

An article includes a cylindrical object such as a linear variable differential transformer (LVDT) and a support body having a keyed slot therethrough. The keyed slot has a cylindrical aperture elongated along an aperture axis and a slot extending radially from the cylindrical aperture. A sleeve is received in the keyed slot and includes an annular segment of a hollow cylinder received within the cylindrical aperture and having a first annular end and a second annular end, an inner annular diameter $D_I$ sized to slidingly receive the cylindrical object therein, and an outer annular diameter $D_O$ sized for the annular segment to fit snugly within the cylindrical aperture. The cylindrical object is received within the annular segment of the hollow cylinder. A first tab extends from the first annular end into the slot, and a second tab extends from the second annular end into the slot and contacts a side of the slot. A force applicator, preferably in the form of a set screw, is positioned to controllably force the first tab toward the second tab.

10 Claims, 2 Drawing Sheets

ARTICLE HAVING A LOCATED AND CLAMPED CYLINDRICAL OBJECT THEREIN

This invention relates to the positioning and retention of a cylindrical object within a structure and, more particularly, to such positioning and retention when the cylindrical object is relatively fragile and may be damaged by an excessive inwardly directed point radial force.

BACKGROUND OF THE INVENTION

A linear variable differential transformer (LVDT) is a sensitive instrument for measuring positional changes. The LVDT has a cylindrical LVDT body with a positional probe extending from the LVDT body along the cylindrical axis of the LVDT body. Small movements of the probe are detected by a transformer within the LVDT body. LVDTs are described in greater detail, for example, in U.S. Pat. No. 4,543,732.

The cylindrical body of the LVDT must be mounted to a stable support structure that holds the LVDT body in a fixed reference position from which the positional changes may be measured. In one approach to holding the LVDT body in a fixed position, the LVDT may be cast into a support, such as a block of epoxy. This approach has the drawbacks that the support may change dimensionally over time and with temperature, that the position of the LVDT body cannot be readily adjusted to a new fixed reference position, and also that the LVDT body cannot be readily removed from the support. In another approach, the LVDT body is placed into a cylindrical bore in the support and retained with a set screw. This approach allows the LVDT body to be repositioned along the bore, but there are significant drawbacks. It is often difficult to achieve the necessary mechanical tolerances on the bore. Additionally, the set screw must be tightened very precisely. If the set screw is undertightened, the LVDT body will wobble and become misaligned in the bore; if it is overtightened, the LVDT body may be deformed so that the LVDT body is damaged. Although the correct tightening of a set screw would seem to be a straightforward matter, in practice the realities of a production environment often result in operators using excessive force and devoting insufficient attention to this step. Additionally, even if the correct amount of force is applied, it is unevenly distributed and may result in damage to the sensitive LVDT.

There is a therefore a need for an improved approach for locating and clamping an LVDT body into a reference position. The present invention fulfills this need, and further provides related advantages.

SUMMARY OF THE INVENTION

The present invention provides an article in which a cylindrical LVDT body is supported. The LVDT body is precisely positioned both angularly and axially. Overtightening and undertightening of a set screw are avoided. The present approach is embodied in the application of most interest, the mounting of the LVDT body, but it is equally applicable to other situations where a cylindrical body must be precisely positioned both angularly and axially.

An article comprises a cylindrical object, and a support body having a keyed slot therethrough. In the application of most interest, the cylindrical object is the body of a linear variable differential transformer (LVDT). The keyed slot comprises a cylindrical aperture elongated along an aperture axis and a slot extending radially from the cylindrical aperture. A sleeve, preferably made of metal, is received in the keyed slot. The sleeve has an annular segment of a hollow cylinder received within the cylindrical aperture. The annular segment has a circumferential first annular end, a circumferential second annular end, an inner annular diameter $D_I$ sized to slidingly receive the cylindrical object therein, and an outer annular diameter $D_O$ sized for the annular segment to fit snugly (i.e., with a "bearing fit") within the cylindrical aperture. The cylindrical object is received within the annular segment. The sleeve further has a first tab extending from the first annular end into the slot (and preferably not contacting a side of the slot), and a second tab extending from the second annular end into the slot and contacting a side of the slot. A force applicator, preferably a set screw, is positioned to controllably force the first tab toward the second tab to tighten the sleeve about the cylindrical object while retaining good alignment within the cylindrical aperture. The annular thickness of the sleeve is preferably small, so that it can readily flex. Desirably, $(D_O - D_I)$ is about 10–15 percent of $D_O$.

To mount a cylindrical object such as an LVDT body using the present approach, the keyed slot is first machined into the support body. The machining is preferably performed by electrodischarge wire machining ("wire EDM"), which produces good tolerances positionally, dimensionally, and angularly. The sleeve is machined, again preferably by wire EDM. The cylindrical object is placed into the sleeve, and the sleeve is inserted into the cylindrical aperture of the keyed slot with the tabs in the slot of the keyed slot. The cylindrical object is axially positioned by sliding it along the sleeve. When it is properly positioned, the set screw is tightened against the first tab to tighten the sleeve around the cylindrical object. The holding force of the set screw is thereby distributed around the circumference of the cylindrical object rather than being applied at a point, and overtightening is avoided by the spring deflection of the first tab.

The present approach thus achieves precise positioning of the cylindrical object without risk of overtightening a set screw that would potentially damage the cylindrical object. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
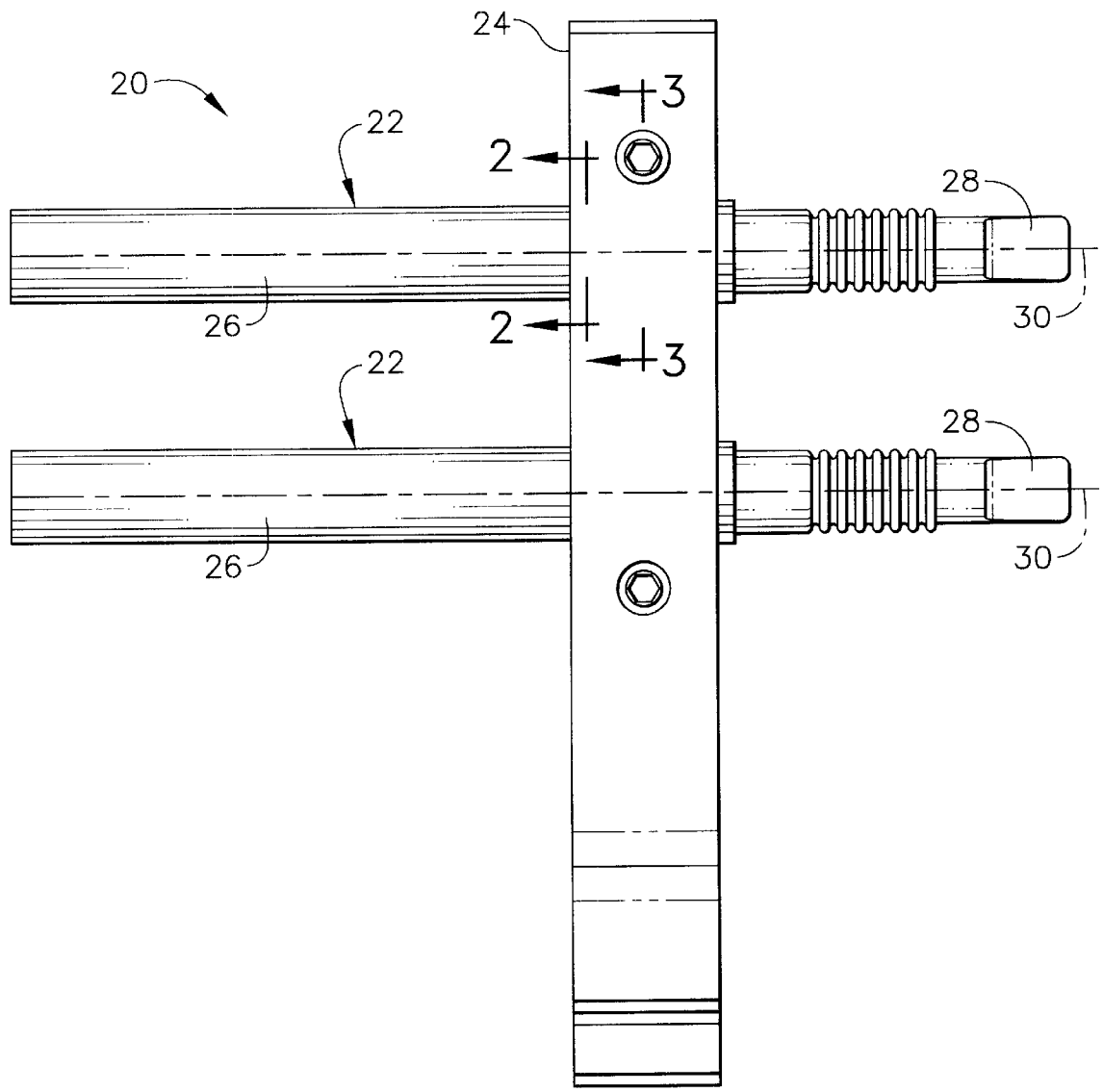
FIG. 1 is an elevational view of two LVDTs mounted to a support body.

FIG. 1 depicts an article 20 including two cylindrical objects 22 supported in a support body 24. The cylindrical objects 22 are preferably LVDT bodies 26, with probes 28 extending axially therefrom collinearly with an aperture axis 30 in each case.

Figure 2:
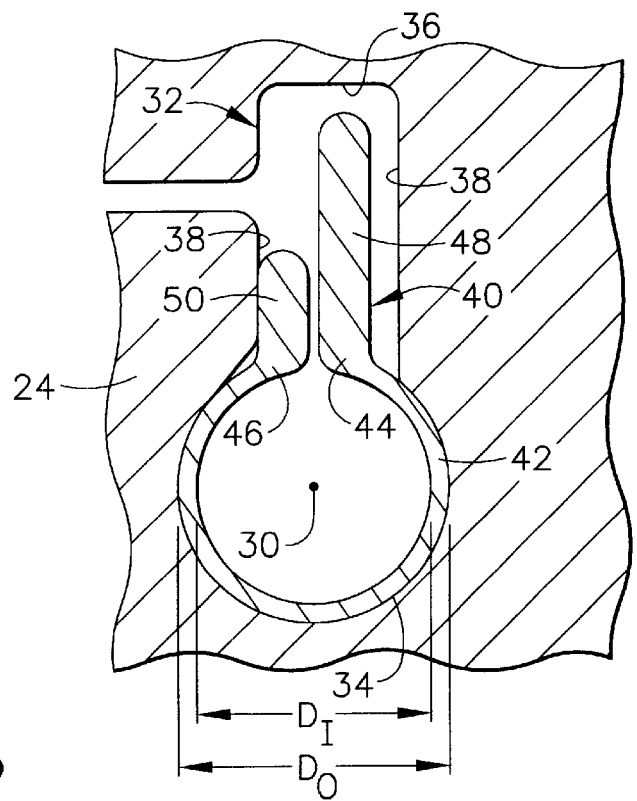
FIG. 2 is a schematic sectional view of a portion of the support body of FIG. 1 but without the LVDT present, taken on line 2—2.

FIG. 2 is a sectional view through a portion of the support body 24, but without the cylindrical object 22 present. For each of the cylindrical objects 22 that is to be supported in the support body 24, the support body 24 has a keyed slot 32 therethrough. The keyed slot 32 includes a cylindrical aperture 34 elongated along the aperture axis 30 (which is perpendicular to the plane of the page in FIG. 2). A slot 36 interrupts the periphery of the cylindrical aperture 34 and extends radially (relative to the axis 30) from the cylindrical aperture 34. The slot 36 preferably has two parallel sides 38. The keyed slot 32 preferably is machined into the support body 24 by wire EDM. Wire EDM is a known process that produces high-quality, tightly toleranced machined features. In the present case, the positioning of the keyed slot 32 has positional tolerances to within +/−0.0002 inches, angular tolerances to within 0.001 per inch runout, and an out-of-round tolerance of the cylindrical aperture to within +/−0.0002 inches TIR.

A sleeve 40 is received in the keyed slot 32. The sleeve 40 is preferably made of a metal such as D2 tool steel. The D2 tool steel exhibits a sufficiently high hardness to resist galling in this sliding fit, and also has sufficient springiness for the required spring effect. The sleeve 40 has an annular segment 42 of a hollow cylinder received within the cylindrical aperture 34. The annular segment 42 has a circumferential first annular end 44, a circumferential second annular end 46, an inner annular diameter $D_I$ sized to slidingly receive the cylindrical object 22 therein, and an outer annular diameter $D_O$ sized for the annular segment 42 to fit snugly within the cylindrical aperture 34. Preferably, $(D_O-D_I)$ is about 10–15 percent of $D_O$, so that the radial thickness of the annular segment 42 is sufficiently small that it can readily bend in the areas near the first annular end 44 and the second annular end 46 to accommodate applied deformation, but sufficiently large to distribute the applied clamping force around the periphery of the object 22. In a preferred embodiment, the difference in the inner diameter of the cylindrical aperture 34 and the outer annular diameter $D_O$ of the sleeve 40 is about 0.0004 inch. The sleeve 40 is preferably machined using wire EDM to achieve the same high tolerances achieved for the keyed slot 32.

Figure 3:
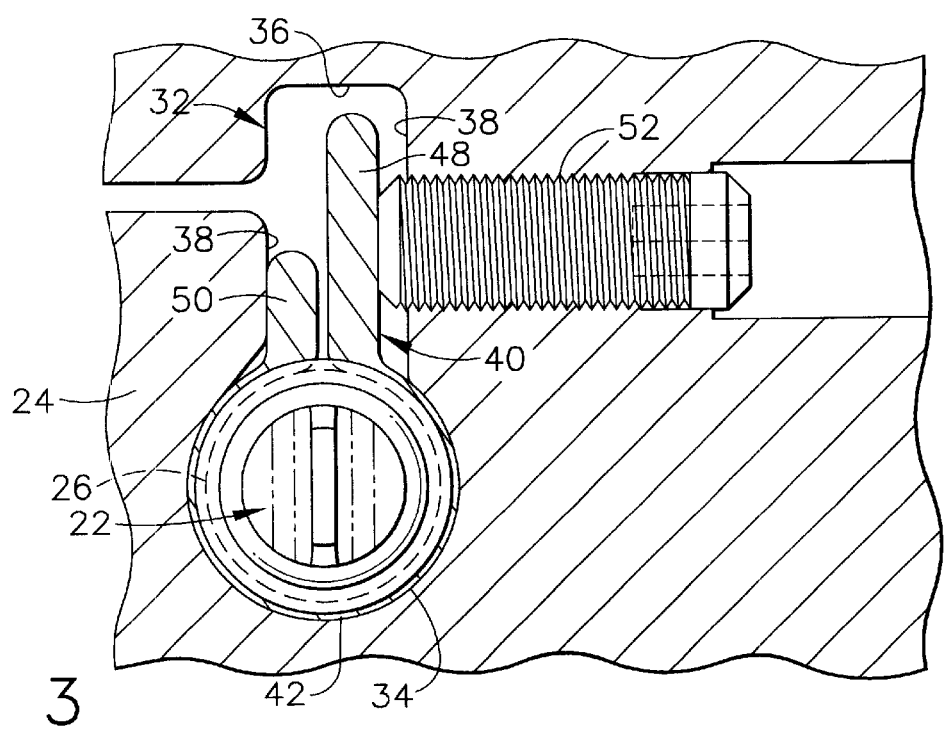
FIG. 3 is a schematic sectional view of a portion of the support body of FIG. 1 with the LVDT present, taken along line 3—3.

As seen in FIG. 3, the cylindrical object 22 is received within the inner annular diameter of the annular segment 42 of the hollow cylinder.

The sleeve 40 includes a first tab 48 integral with the first annular end 44 of the annular segment 42 and extending into the slot 36. The first tab 48 preferably does not contact either of the slot sides 38. A second tab 50 is integral with the second annular end 46 of the annular segment 42 and extends into the slot 36. The second tab 50 preferably contacts one side 38 of the slot 36. The material of the tabs 48 and 50 is thicker than the material of the annular segment 42 so that the tabs may bear the force applied to them.

Referring to FIG. 3, a force applicator, illustrated as a set screw 52, is positioned to controllably contact and force the first tab 48 toward the second tab 50. The second tab 50 serves to react forces applied to the first tab 50, and transmitted to the second tab 50 through the annular segment 42, against the side 38 of the slot 36 to prevent the sleeve 40 from rotating in the cylindrical aperture 34.

When the article 20 is to be fabricated and assembled, the keyed slot 32 is machined in the support body 24, and the sleeve 40 is machined, both preferably by wire EDM. The cylindrical object 22, here the LVDT body 26, is inserted into the interior of the annular segment 42 of the sleeve 40. The sleeve 40 and its inserted cylindrical object 22 are inserted into the keyed slot 32 in the manner shown in FIG. 3, but with the set screw 52 withdrawn so that it does not contact the first tab 48. The axial position of the cylindrical object 22 parallel to the aperture axis 30 is adjusted to achieve the desired position. When the desired axial position is reached, the set screw 52 is tightened to contact the first tab 48 and force it toward the second tab 50. The clamping force thereby applied is distributed around the circumference of the cylindrical object 22. Because the clamping force of the set screw is not applied directly to the cylindrical object 22, because the applied clamping force is distributed around the circumference of the cylindrical object 22, and because the deflection of the first tab 48 absorbs excessive applied set-screw force, the cylindrical object 22 cannot be damaged by the clamping force. The present invention may be used with any type of cylindrical object 22, but it is most beneficially utilized with relatively fragile or easily damaged cylindrical objects 22. As the clamping force is applied, the snug fit between the annular segment 42 of the sleeve 40 and the cylindrical aperture 34 ensures that the desired positional and angular locating of the cylindrical object 22 will not be lost.

A prototype of the present article 20, used to support an LVDT body 26, was fabricated and tested. The approach worked well and in the manner discussed above, with no damage or deformation to the LVDT body 26. Overall positioning of the LVDT body 26 was to within +/−0.00025 inch.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article comprising:
   a cylindrical object;
   a support body having a keyed slot therethrough, the keyed slot comprising a cylindrical aperture elongated along an aperture axis and a slot extending radially from the cylindrical aperture;
   a sleeve received in the keyed slot, the sleeve having
      an annular segment of a hollow cylinder received within the cylindrical aperture, the annular segment having a circumferential first annular end, a circumferential second annular end, an inner annular diameter $D_I$ sized to slidingly receive the cylindrical object therein, and an outer annular diameter $D_O$ sized for the annular segment to fit snugly within the cylindrical aperture, wherein the cylindrical object is received within the annular segment of the hollow cylinder,
      a first tab extending from the first annular end into the slot, and
      a second tab extending from the second annular end into the slot and contacting a side of the slot; and
   a force applicator positioned to controllably force the first tab toward the second tab.

2. The article of claim 1, wherein the cylindrical object is a linear variable differential transformer.

3. The article of claim 1, wherein the annular segment is made of a metal.

4. The article of claim 1, wherein the first tab does not contact a side of the slot.

5. The article of claim 1, wherein $(D_O-D_I)$ is about 10–15 percent of $D_O$.

6. The article of claim 1, wherein the force applicator is a set screw in the support body.

7. An article comprising:
a linear variable differential transformer having an LVDT body with a cylindrical outer surface;
a support body having a keyed slot therethrough, the keyed slot comprising a cylindrical aperture elongated along an aperture axis and a slot extending radially from the cylindrical aperture;
a sleeve received in the keyed slot, the sleeve having
an annular segment of a hollow cylinder received within the cylindrical aperture, the annular segment having a circumferential first annular end, a circumferential second annular end, an inner annular diameter $D_I$ sized to receive the cylindrical object snugly therein, and an outer annular diameter $D_O$ sized for the annular segment to fit snugly within the cylindrical aperture, wherein the LVDT body is received within the annular segment of the hollow cylinder,
a first tab extending from the first annular end into the slot, and
a second tab extending from the second annular end into the slot and contacting a side of the slot; and
a set screw in the support body positioned to controllably force the first tab toward the second tab.

8. The article of claim 7, wherein the sleeve is made of a metal.

9. The article of claim 7, wherein the first tab does not contact a side of the slot.

10. The article of claim 7, wherein $(D_O - D_I)$ is about 10–15 percent of $D_O$.

* * * * *